(12) United States Patent
Kahn et al.

(10) Patent No.: US 6,974,083 B1
(45) Date of Patent: Dec. 13, 2005

(54) POINT-OF-TRANSACTION WORKSTATION FOR ELECTRO-OPTICALLY READING ONE-DIMENSIONAL INDICIA, INCLUDING IMAGE CAPTURE OF TWO-DIMENSIONAL TARGETS

(75) Inventors: Joel Kahn, Rockville Centre, NY (US); Mehul M. Patel, Fort Salonga, NY (US); Robert May, Sayville, NY (US); Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/897,721

(22) Filed: Jul. 23, 2004

(51) Int. Cl.[7] .............................................. G06K 7/10
(52) U.S. Cl. ........................ 235/462.14; 235/462.01; 235/462.04; 235/462.11; 235/462.13; 235/462.17; 235/462.25; 235/462.46; 235/472.01
(58) Field of Search ...................... 235/462.14, 462.13, 235/462.25, 462.11, 462.04, 462.42, 462.01, 235/462.17, 472.01, 462.43

(56) References Cited

U.S. PATENT DOCUMENTS

| | | | | |
|---|---|---|---|---|
| 6,003,773 | A * | 12/1999 | Durbin et al. | 235/462.45 |
| 6,332,575 | B1 * | 12/2001 | Schuessler et al. | 235/462.13 |
| 6,398,112 | B1 * | 6/2002 | Li et al. | 235/462.01 |
| 6,708,883 | B2 * | 3/2004 | Krichever | 235/462.01 |
| 6,832,729 | B1 * | 12/2004 | Perry et al. | 235/472.01 |
| 2001/0042789 | A1 * | 11/2001 | Krichever et al. | 235/462.14 |
| 2003/0018522 | A1 * | 1/2003 | Denimarck et al. | 705/14 |
| 2004/0134987 | A1 * | 7/2004 | Check et al. | 235/462.14 |

* cited by examiner

*Primary Examiner*—Diane I. Lee
*Assistant Examiner*—Allyson N Trail
(74) *Attorney, Agent, or Firm*—Kirschstein, et al.

(57) ABSTRACT

A solid-state imager is mounted at a point-of-transaction workstation for capturing images of diverse targets useful for customer identification, customer payment validation, and operator surveillance. The imager is manually or automatically triggered and is operated at high speed to resist image blurring due to relative movement between the target and the imager.

17 Claims, 2 Drawing Sheets

POINT-OF-TRANSACTION WORKSTATION FOR ELECTRO-OPTICALLY READING ONE-DIMENSIONAL INDICIA, INCLUDING IMAGE CAPTURE OF TWO-DIMENSIONAL TARGETS

BACKGROUND OF THE INVENTION

1. Field of the Invention

The present invention generally relates to an electro-optical reader for reading indicia and, more particularly, to a point-of-transaction workstation for reading not only one-dimensional indicia, such as bar code symbols, but also for reading two-dimensional indicia by image capture, as well as capturing images of other two-dimensional targets, such as signatures, checks, credit cards, debit cards, drivers' licenses, and people.

2. Description of the Related Art

Flat bed laser readers, also known as horizontal slot scanners, have been used to electro-optically read one-dimensional bar code symbols, particularly of the Universal Product Code (UPC) type, at a point-of-transaction workstation in supermarkets, warehouse clubs, department stores, and other kinds of retailers for many years. As exemplified by U.S. Pat. No. 5,059,779; U.S. Pat. No. 5,124,539 and U.S. Pat. No. 5,200,599, a single, horizontal window is set flush with, and built into, a horizontal countertop of the workstation. Products to be purchased bear an identifying symbol and are typically slid across the horizontal window through which a multitude of scan lines is projected in a generally upwards direction. When at least one of the scan lines sweeps over a symbol associated with a product, the symbol is processed and read.

The multitude of scan lines is generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the horizontal window as a scan pattern of the scan lines.

It is also known to provide a point-of-transaction workstation with a generally vertical window that faces an operator at the workstation. The generally vertical window is oriented perpendicularly to the horizontal window, or is slightly rearwardly inclined. The scan pattern generator within the workstation also projects the multitude of scan lines in a generally outward direction through the vertical window toward the operator. The generator for the vertical window can be the same as or different from the generator for the horizontal window. The operator slides the products past either window from right to left, or from left to right, in a "swipe" mode. Alternatively, the operator merely presents the symbol on the product to the center of either window in a "presentation" mode. The choice depends on operator preference or on the layout of the workstation.

Sometimes, the vertical window is not built into the workstation as a permanent installation. Instead, a vertical slot scanner is configured as a portable reader which is placed on the countertop of an existing horizontal slot scanner.

Each product must be oriented by the operator with the symbol facing away from the operator and directly towards either window. Hence, the operator cannot see exactly where the symbol is during scanning. In typical "blind-aiming" usage, it is not uncommon for the operator to repeatedly swipe or present a single symbol several times before the symbol is successfully read, thereby slowing down transaction processing and reducing productivity.

The blind-aiming of the symbol is made more difficult because the position and orientation of the symbol are variable. The symbol may be located low or high, or right to left, on the product, or anywhere in between. The symbol may be oriented in a "picket fence" orientation in which the elongated parallel bars of the one-dimensional UPC symbol are vertical, or in a "ladder" orientation in which the symbol bars are horizontal, or at any orientation angle in between.

In such an environment, it is important that the scan lines located at, and projected from, either window provide a full coverage scan zone which extends down as close as possible to the countertop, and as high as possible above the countertop, and as wide as possible across the width of the countertop. The scan patterns projected into space in front of the windows grow rapidly in order to cover areas on products that are positioned not on the windows, but several inches therefrom. The scan zone must include scan lines oriented to read symbols positioned in any possible way across the entire volume of the scan zone.

As advantageous as these point-of-transaction workstations are in processing transactions involving products associated with one-dimensional symbols each having a row of bars and spaces spaced apart along one direction, the workstations cannot process two-dimensional symbols, such as Code 39 which introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786. Such two-dimensional symbols are generally read by electro-optical readers operative for projecting a laser beam as a raster of scan lines, each line extending in one direction over a respective row, and all the lines being spaced apart along a height of the two-dimensional symbol in a generally perpendicular direction.

Both one- and two-dimensional symbols can also be read by employing solid-state imagers. For example, an image sensor device may be employed which has a one- or two-dimensional array of cells or photosensors which correspond to image elements or pixels in a field of view of the device. Such an image sensor device may include a one- or two-dimensional charge coupled device (CCD) or a complementary metal oxide semiconductor (CMOS) device and associated circuits for producing electronic signals corresponding to a one- or two-dimensional array of pixel information for a field of view.

It is therefore known to use a solid-state device for capturing a monochrome image of a symbol as, for example, disclosed in U.S. Pat. No. 5,703,349. It is also known to use a solid-state device with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

However, the known point-of-transaction workstations do not generate raster scans capable of reading two-dimensional symbols, nor do they utilize solid-state imagers for capturing images of two-dimensional targets, especially two-dimensional symbols required to be electro-optically read. To acquire a target image, a solid-state imager, for example as embodied in a consumer digital camera, must be held in a stationary position relative to the target. Only when a solid-state imager is held in a fixed position relative to a target symbol can an image of the symbol be reliably captured and decoded, with the data encoded in the symbol being sent to a host for processing. In the context of a point-of-transaction workstation where the operator swipes the symbol past the window, sometimes once, sometimes several times, and where the operator presents the symbol with an additional component of movement toward and away from a window, and in some cases where the symbols are transported on a moving conveyor past a window, the image of the symbol is blurred due to the relative motion between the symbol and the imager and, as a result, the image cannot be reliably and successfully decoded and read.

SUMMARY OF THE INVENTION

OBJECTS OF THE INVENTION

Accordingly, it is an object of this invention is to advance the state of the art of point-of-transaction workstations to electro-optically read both one- and two-dimensional symbols.

Another object of this invention is to reliably capture two-dimensional target images at point-of-transaction workstations without image blurring.

Still another object of this invention is to manually or automatically capture images of diverse targets at such workstations to enhance workstation capability.

FEATURES OF THE INVENTION

In keeping with these objects and others which will become apparent hereinafter, one feature of this invention resides, briefly stated, in an arrangement for processing transactions, comprising a stationary point-of-transaction workstation having a window, and an electro-optical reader mounted within the workstation, the reader being operative for projecting a laser beam as a plurality of scan lines through the window, and for electro-optically reading a one-dimensional indicium associated with a transaction presented at the window when at least one of the scan lines is swept across at least a part of the one-dimensional indicium. By way of example, the one-dimensional indicium is a UPC symbol associated with an object passing through the workstation. In the preferred application, the object is a product to be purchased by a consumer, and the workstation is installed in a retail establishment, such as a supermarket.

In accordance with this invention, a two-dimensional, solid-state imager is mounted at the workstation, and is operative for capturing light from a two-dimensional target. The target may be a two-dimensional symbol to be electro-optically read. The target may also be a personal check, a credit card, or a debit card presented by the consumer for payment of the products being purchased. The target may also be a signature of the consumer, or the consumer himself or herself. The target may also be a form of identification of the consumer, such as a driver's license, especially one on which a two-dimensional symbol is pre-printed, for validating one's identity and age. The target may even be the operator himself or herself for use in video surveillance for security purposes.

The imager is fixedly mounted at the workstation and may be mounted behind the window, or exteriorly of the workstation. When the workstation has an upright window and a horizontal window, the imager can be located behind either window, but preferably is mounted behind the upright window. When video surveillance is desired, it is beneficial to conceal the imager behind a window. More than one imager may be utilized in a single workstation, in which case an imager can be mounted behind each window.

The imager may be triggered manually or automatically. For example, the operator may manually trigger the imager to capture an image of the check or card presented for payment, or the consumer's signature, the consumer's driver's license, or the consumer. The imager is preferably automatically triggered to take a photograph of the operator during video surveillance, each time a cash register is opened, or each time a symbol is scanned and read, or on a regular or random basis. The imager is free-running to capture an image of a two-dimensional symbol.

The imager is associated with a high-speed illuminator to enable the image of the target to be acquired in a very short period of time, for example, on the order of 100 microseconds, so that the target image is not blurred even if there is relative motion between the imager and the target.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
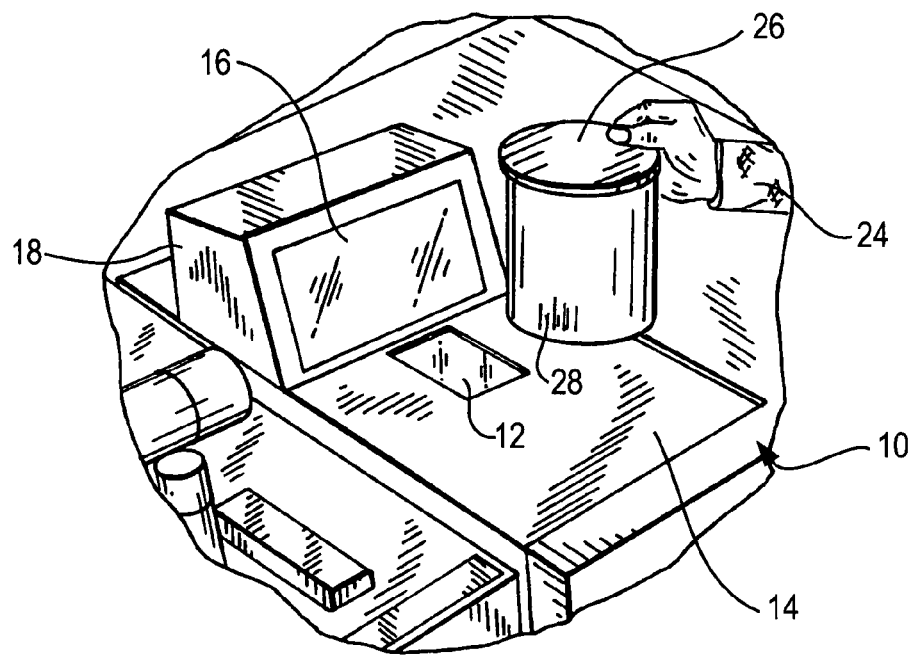
FIG. 1 is a perspective view of a dual window point-of-transaction workstation operative for reading one-dimensional indicia and for capturing light from two-dimensional targets in accordance with this invention.

FIG. 1 depicts a dual window, point-of-transaction workstation 10 used by retailers to process transactions involving the purchase of products bearing an identifying symbol, typically the UPC symbol described above. Workstation 10 has a horizontal window 12 set flush into a countertop 14, and a vertical or generally vertical (referred to as "vertical" or "upright" hereinafter) window 16 set flush into a raised housing 18 above the countertop.

Figure 2:
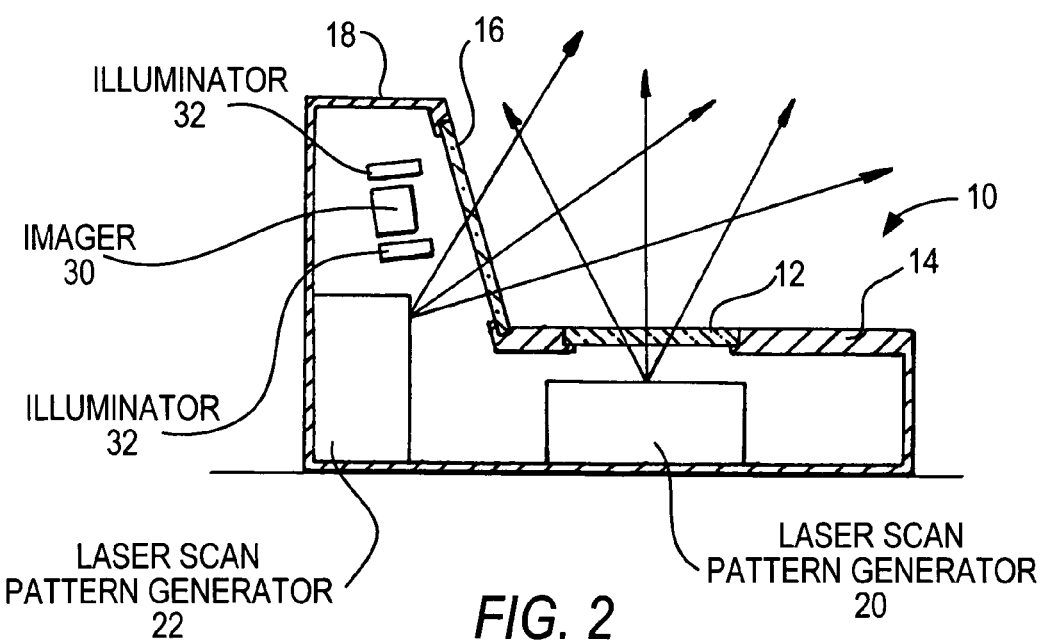
FIG. 2 is a part-sectional, part-diagrammatic view of the workstation of FIG. 1.

A first laser scan pattern generator 20, shown schematically in FIG. 2, is operative to project generally upwards out of the horizontal window 12 a laser beam as a first set of scan lines, and a second laser scan pattern generator 22, also shown schematically in FIG. 2, is operative to project generally sideways out of the upright window 16 a laser beam as a second set of scan lines. The pattern generators 20, 22 may be combined and use a single laser source, together with beam splitters and folding mirrors to direct a single laser beam through both windows or, as shown, can be two discrete assemblies, each with its own laser source, for directing a respective laser beam through a respective window, as disclosed, for example, in U.S. Pat. No. 6,631,845, the entire contents of which are incorporated herein by reference thereto.

In use, an operator 24, such as a person working at a supermarket checkout counter, processes a product 26 bearing a UPC symbol 28 thereon, past the windows 12, 18 by swiping the product across a respective window in the abovementioned swipe mode, or by presenting the product at the respective window in the abovementioned presentation mode. If the symbol 28 is located on the bottom of the product, then one of the scan lines projected through the horizontal window 12 will traverse the symbol. If the symbol 28 is located on the side of the product, then one of the scan lines projected through the upright window 16 will traverse the symbol.

As described so far, the workstation is conventional and is operative to read one-dimensional UPC symbols. In accordance with this invention, an imager 30 including an illuminator 32 are mounted at the workstation, for capturing light from a two-dimensional target which, as described below, can be a two-dimensional symbol. The imager 30 is a solid-state area array, preferably a CCD or CMOS array. The imager 30 can be fixedly mounted exteriorly of the workstation on the housing 18, or the countertop 14, but preferably is mounted behind one of the windows, especially the upright window 16. One or more imagers can be employed with an imager at each window. The illuminator 32 is preferably a plurality of light sources, e.g., light emitting diodes (LEDs), arranged in an annulus around the imager 30 to uniformly illuminate the target, as further described below.

Figure 3:
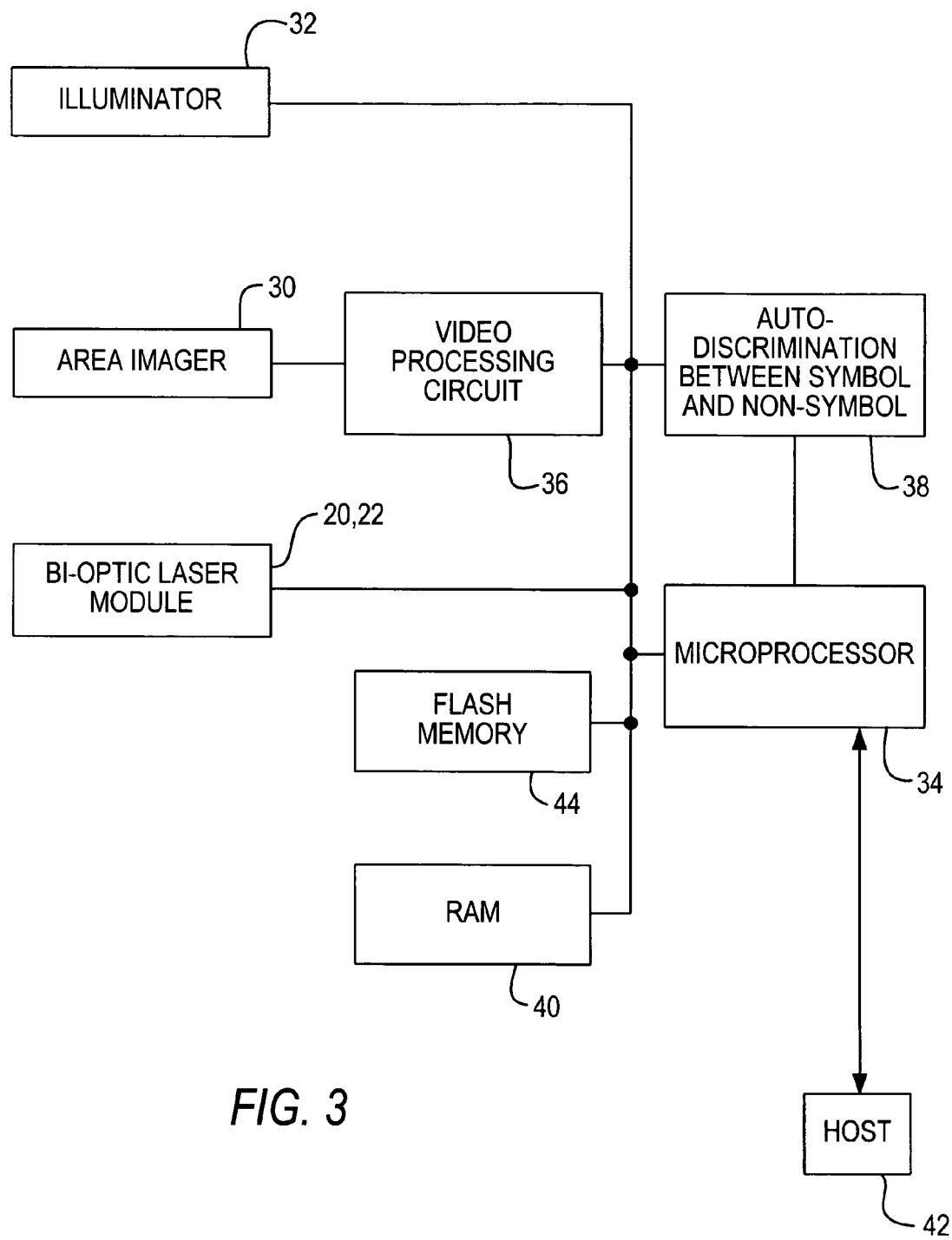
FIG. 3 is a block circuit diagram of various components of the workstation of FIG. 1.

As shown in FIG. 3, a bi-optic laser module comprised of the pattern generators 20, 22, the area imager 30, and the illuminator 32 are operatively connected to a microprocessor 34 operative for controlling the operation of these components. Preferably, the microprocessor is the same as the one used for decoding light scattered from the indicia and for processing the captured target images.

In operation, the microprocessor 34 sends a command signal to the illuminator 32 to pulse the LEDs for a short time period of 100 microseconds or less, and energizes the area imager 30 to collect light from a target only during said time period. By acquiring a target image during this brief time period, the image of the target is not blurred even in the presence of relative motion between the imager and the target.

There are several different types of targets which have particular utility for the enhancement of the operation of the workstation. The target may be a personal check, a credit card, or a debit card presented by a customer for payment of the products being purchased. The operator need only swipe or present these payment targets at the window 16 for image capture.

The target may also be a signature, a driver's license, or the consumer himself or herself. Capturing an image of the driver's license is particularly useful since many licenses are encoded with two-dimensional indicia bearing age information, which is useful in validating a customer's age and the customer's ability to purchase age-related products, such as alcoholic beverages or tobacco products.

The target may be the operator himself or herself, which is used for video surveillance for security purposes. Thus, it can be determined if the operator is actually scanning the products, or passing them around the window in an effort to bypass the window and not charge the customer in a criminal practice known in retailing as "sweethearting".

The target may, of course, be two-dimensional symbols whose use is becoming more widespread, especially in manufacturing environments and in package delivery. Sometimes, the target includes various lengths of truncated symbols of the type frequently found on frequent shopper cards, coupons, loyalty cards, in which case the area imager can read these additional symbols.

The energization of the imager 30 can be manual and initiated by the operator. For example, the operator can depress a button, or a foot pedal, or simply open a drawer of a cash register. The energization can also be automatic such that the imager operates in a continuous image acquisition mode which, of course, is the desired mode for video surveillance of the operator, as well as for decoding two-dimensional symbols.

The continuous video stream generated during a continuous image acquisition mode can, however, overload a conventional video processing circuit and, as a result, cause some frames of the target image to be dropped. In further accordance with this invention, a high-speed video processing circuit 36 receives the continuous video stream and, with the aid of an auto-discrimination circuit 38, determines and selects which images in the stream are one-dimensional symbols, which images are two-dimensional symbols, and which images are not symbols at all. The auto-discrimination circuit 38, after such selection, transfers only the symbols to the microprocessor 34 for decoding. The software to be downloaded to the auto-discrimination circuit is stored in the flash memory 44. This dramatically reduces the computational burden on the microprocessor 34. The non-symbol images can be directly transferred to a memory, such as RAM 40, or directly routed by the microprocessor to a host 42. The method used for autodiscrimination between one- and two-dimensional symbols is described in U.S. Pat. No. 6,250,551, the entire contents of which are incorporated herein by reference thereto.

It will be understood that each of the elements described above, or two or more together, also may find a useful application in other types of constructions differing from the types described above.

While the invention has been illustrated and described as embodied in a point-of transaction workstation for electro-optically reading one-dimensional indicia, including image capture of two-dimensional targets, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for processing transactions, comprising:
   a) a stationary workstation having a window;
   b) an electro-optical reader mounted within the workstation, for projecting a laser beam as a plurality of scan lines through the window, and for electro-optically reading a one-dimensional symbol associated with a transaction presented at the window when at least one of the scan lines is swept across at least a part of the one-dimensional symbol to generate a transaction signal;
   c) a two-dimensional, solid-state imager mounted at the workstation, for capturing light from a two-dimensional target at the workstation to generate an image signal, the target including a non-symbol target; and d) a processing circuit for discriminating between the symbol and the non-symbol target, and for separately processing the transaction signal and the image signal.

2. The arrangement of claim 1, wherein the imager is located behind the window.

3. The arrangement of claim 1, wherein the window is located in a horizontal plane, and wherein the workstation has an upright window lying in a plane that intersects the horizontal plane, and wherein the imager is located behind one of the windows.

4. The arrangement of claim 1, wherein the imager includes a two-dimensional, charge coupled device (CCD) array.

5. The arrangement of claim 1, wherein the imager includes an illuminator for illuminating the target in a time period less than 100 microseconds, and wherein the imager captures the light only during said time period.

6. The arrangement of claim 1, wherein the transaction is a purchase of goods passed by the window, and wherein the non-symbol target is one of a personal check and a card presented by a consumer for payment of the goods being purchased.

7. The arrangement of claim 6, wherein the non-symbol target is also one of a signature, a driver's license, and the consumer.

8. The arrangement of claim 6, wherein the transaction is a purchase of goods passed by an operator past the window, and wherein the non-symbol target is an operator.

9. The arrangement of claim 1, wherein the processing circuit includes an auto-discriminator, and a common processor operatively connected with the reader and the imager for decoding the transaction signal, and for routing the image signal to a remote host.

10. The arrangement of claim 1, wherein the processing circuit includes an auto-discriminator, and a memory for storing the image signal.

11. The arrangement of claim 1, wherein the imager is manually triggered by an operator.

12. The arrangement of claim 1, wherein the imager is automatically triggered.

13. A method of processing transactions, comprising the steps of:
   a) mounting a window at a stationary workstation;
   b) projecting a laser beam as a plurality of scan lines through the window, and electro-optically reading a one-dimensional symbol associated with a transaction presented at the window when at least one of the scan lines is swept across at least a part of the one-dimensional symbol to generate a transaction signal;
   c) capturing light from a two-dimensional target at the workstation with a two-dimensional, solid-state imager mounted at the workstation to generate an image signal, the target including a non-symbol target; and
   d) discriminating between the symbol and the non-symbol target, and separately processing the transaction signal and the image signal.

14. The method of claim 13, and locating the imager behind the window.

15. The method of claim 13, and illuminating the non-symbol target in a time period less than 100 microseconds, and wherein the capturing step is performed by capturing the light only during said time period.

16. The method of claim 13, and manually triggering the imager.

17. The method of claim 13, and automatically triggering the imager.

* * * * *